United States Patent
Baer et al.

(10) Patent No.: US 10,015,292 B2
(45) Date of Patent: Jul. 3, 2018

(54) HANDLING OF TIMERS

(71) Applicant: Telefonaktiebolaget L M Ericsson (publ), Stockholm (SE)

(72) Inventors: Anders Baer, Årsta (SE); Tobias Austrell, Älvsjö (SE); Timo Forsman, Sollentuna (SE); Jan Anders Tellinger, Hägersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 125 days.

(21) Appl. No.: 14/780,664

(22) PCT Filed: Apr. 5, 2013

(86) PCT No.: PCT/EP2013/057221
§ 371 (c)(1),
(2) Date: Sep. 28, 2015

(87) PCT Pub. No.: WO2014/161602
PCT Pub. Date: Oct. 9, 2014

(65) Prior Publication Data
US 2016/0057257 A1    Feb. 25, 2016

(51) Int. Cl.
*H04L 29/06*    (2006.01)
(52) U.S. Cl.
CPC .......... *H04L 69/28* (2013.01); *H04L 65/1016* (2013.01)
(58) Field of Classification Search
CPC ... H04J 3/00; H04J 3/1694; H04J 3/26; H04L 69/28; H04L 65/1016
See application file for complete search history.

(56) References Cited

U.S. PATENT DOCUMENTS

2003/0212912 A1    11/2003    Bajko et al.
2005/0240674 A1    10/2005    Depalma et al.
(Continued)

FOREIGN PATENT DOCUMENTS

CN    102377556 A    3/2012
EP    2111015 A1    10/2009

OTHER PUBLICATIONS

3rd Generation Partnership Project, "3rd Generation Partnership Project; Technical Specification Group Services and System Aspects; IP Multimedia Subsystem (IMS); Stage 2 (Release 11)", Technical Specification, 3GPP TS 23.228 V11.7.0, Dec. 1, 2012, pp. 1-290, 3GPP, France.
(Continued)

*Primary Examiner* — Ayaz Sheikh
*Assistant Examiner* — Debebe Asefa
(74) *Attorney, Agent, or Firm* — Coats & Bennett, PLLC

(57) ABSTRACT

System, methods, entities, and computer program for handling timers in a communication network are described. The communication network comprises a plurality of entities (100-108). The method in a first entity (100) comprises determining (301) whether a supervision condition for supervising a communication procedure is fulfilled. The method further comprises adding (308), based on a result of the step of determining the supervision condition (301), a timer validity information to a signaling message related to the communication procedure, and sending (308) the signaling message to a second entity (102). The method in a second entity (102-108) comprises receiving (400) a signaling message associated with a communication procedure, the signaling message containing a timer validity information. The method further comprises determining (401) whether a further processing condition for performing further steps of the communication procedure is fulfilled, the
(Continued)

further processing condition being associated with the timer validity information. The system, entities (100-108) and computer program associated with these methods are also described. Therefore an improved handling of time supervisions in a communication network is achieved in terms of accuracy of supervision timeout, and eliminating a triggering of unwanted remote actions after local timeout.

11 Claims, 8 Drawing Sheets

(56) References Cited

U.S. PATENT DOCUMENTS

2008/0108348 A1 5/2008 Kottilingal et al.
2009/0141742 A1 6/2009 Huh et al.
2010/0020705 A1* 1/2010 Umeda .................. H04L 43/10
  370/252
2011/0206019 A1* 8/2011 Zhai ...................... H04W 56/00
  370/336

OTHER PUBLICATIONS

3rd Generation Partnership Project, "3rd Generation Partnership Project; Technical Specification Group Core Network and Terminals; IP multimedia call control protocol based on Session Initiation Protocol (SIP) and Session Description Protocol (SDP); Stage 3 (Release 11)", Technical Specification, 3GPP TS 24.229 V11.6.0, Dec. 1, 2012, pp. 1-777, 3GPP, France.

Donovan et al. "Session Timers in the Session Initiation Protocol (SIP)"; Network Working Group, Request for Comments: 4028, Standards Track; Apr. 2005; pp. 1-27; CPEL1552993P; The Internet Society.

* cited by examiner

HANDLING OF TIMERS

TECHNICAL FIELD

The present invention relates to telecommunications and in particular to system methods, nodes and computer program for handling timers in a communication network.

BACKGROUND

Timers are widely used in communication networks to supervise communication procedures and signaling exchange between entities of the communication network based on protocols. An example of such entities may be a Call Session Control Function, CSCF, being an essential node in an IP Multimedia System, IMS, for processing signaling, using a Session Initiation Protocol, SIP, as the signaling protocol. CSCF handles session establishment, modification and release of IP multimedia sessions using the SIP/Session Description Protocol, SDP, protocol suite. A 3rd Generation Partnership Project, 3GPP Technical Specification, TS 23.228 describes logical nodes Proxy P-CSCF, Interrogating I-CSCF, Serving S-CSCF, Emergency E-CSCF and Border Gateway Control Function, BGCF.

The S-CSCF conforms to 3GPP TS 24.229 specification and performs the session control services for a User Equipment, UE. It maintains a session state for support of the services requested by and offered to the UE.

The S-CSCF performs for example the following functions:
- Acts as a registrar according to RFC3261 at registration
- Notify subscribers about registration changes
- Session control for the registered user's sessions
- Handles SIP requests and services them internally or forwards them
- Interaction with application servers An S-CSCF performs SIP routing according to the 3GPP routing procedures.

RFC 3261 defines SIP timers for supervising the lifetime of a transaction within the network. Dependent on what type of request (non-INVITE or INVITE request) or response (successful or not successful) and what type of transport protocol is used (User Datagram Protocol, UDP or Transmission Control Protocol, TCP) different SIP timers are used.

Following SIP transaction timers are applicable within the CSCF:

Timer T1—Round-Trip Time estimate

Timer T1 is used to supervise transactions at UDP transport. The timer is configurable. The value shall be the estimated round-trip time. CSCF does not directly use T1 as a timer, T1 is instead used to calculate the timers A, B, E, F, G, H and J.

Timer T2—Maximum retransmit interval for non-INVITE requests and INVITE responses Timer T2 defines the maximum retransmission interval for non-INVITE requests and INVITES responses. The T2 value is used as a maximum value for timer E and timer G.

Timer T4—Maximum duration a message will remain in the network

Timer T4 defines the maximum duration a message will remain in the network. The timer is configurable. The value T4 is used as a value for timer I and timer K.

Timer A—INVITE request retransmit interval for UDP only

Timer B—INVITE transaction timeout timer

Timer C—Proxy INVITE transaction timeout

Timer D—wait time for response retransmits

Timer E—non-INVITE request retransmit interval for UDP only

Timer F—Maximum waiting time for final response for a non-INVITE transaction

Timer G—INVITE response retransmit interval

Timer H—wait time for ACK receipt after 3xx-6xx SIP responses

Timer I—wait time for ACK retransmits

Timer J—Maximum waiting time for request re-transmits for a non-INVITE request

Timer K—Waiting time for response retransmits for non-INVITE requests

Timers are started hop-by-hop at each entity that needs to keep track of a transaction.

In IMS using SIP as mechanism of signaling communication, transactions are monitored hop-by-hop by the entities that are involved in the communication chain. This means that timers are started for different type of information to be sent or received to keep track of the valid lifetime, so re-transmission or canceling of the transaction can be performed as appropriate.

In the communication between entities there could be several entities included and each of them has own timer settings local to the specific entity. Relations in timer settings between entities are usually configured and coordinated manually and there is no logic in the entities of informing its own peers what they will use for a given communication procedure.

As between entities, entities keep track of their own timers only, communication procedures can get out-of-sync for communication traversing a network and timers time-out in one entity within the chain before the response has been received.

There could also be race condition occurring when timers are expired and communications related to the same sessions are competing through the network to reach its destination.

In large networks with multiple destinations as alternative routing paths, timer relations really matters if the configured paths will ever be tried before the timer in previous hops expired.

For services involving serial forking of communication to multiple contacts the timer knowledge is of interest to know how long it is sufficient to wait before canceling a request. In a worst case, a new forking is done at a remote entity, although a local timer for the related communication procedure has expired already.

SUMMARY

It is an object of the invention to provide measures with which handling of timers in a communication is improved in terms of accuracy of supervision timeout, and triggering of unwanted remote actions after local timeout. It is also an object of the invention to provide corresponding methods, nodes, and computer programs.

The objects defined above are solved by the features of the independent claims. Preferred embodiments of the invention are described in the dependent claims.

According to an exemplary aspect of the invention, a method for handling time supervision in a communication network comprising a plurality of entities is provided. The method comprises determining, by a first entity, whether a supervision condition for supervising a communication procedure is fulfilled. The method comprises, based on a result of the step of determining the supervision condition, adding, by the first entity, a timer validity information to a signaling message related to the communication procedure, and sending the signaling message to a second entity to be involved in the communication procedure.

The method may further comprise that the supervision condition is associated with a type of the communication procedure and is involving at least one further entity of the plurality of entities in the communication network.

According to another exemplary aspect of the invention, a method for handling time supervision in a communication network comprising a plurality of entities is provided. The method comprises receiving, by a second entity, a first signaling message associated with a communication procedure from a first entity, the first signaling message containing a first timer validity information. The method comprises, determining, by the second entity, whether a further processing condition for performing a further step of the communication procedure is fulfilled, the further processing condition being associated with the first timer validity information.

The method may further comprise, that the further step of the communication procedure is any one of the following steps: Sending, by the second entity, a further signaling message associated with the communication procedure to a further entity of the plurality of entities of the communication network, the further signaling message containing a further timer validity information. Sending, by the second entity, a further signaling message associated with a further communication procedure to a further entity of the plurality of entities of the communication network, the further signaling message containing a further timer validity information. Sending, by the second entity, a response to the first signaling message to the first entity, or, terminating, by the second entity, the communication procedure.

The method may further comprise, that, if a supervision period of the further signaling message expires before expiration of the first timer validity information, the second timer validity information is set equal to a current time plus a supervision period of the further signaling message, else, the second timer validity information is set equal to the first timer validity information.

According to another exemplary aspect of the invention, a network entity for handling time supervision in a communication network comprising a plurality of entities, the network entity being capable of determining whether a communication procedure is to be started which requires time supervision. The network entity being further capable of determining a current time and determining a time supervision period associated with the communication procedure. The network entity being further capable of sending a signaling message related to the communication procedure, the signaling message comprising the timer validity information based on the current time and the time supervision period. The network entity being further capable of time supervising the reception of a response to the signaling message. The network entity being further capable of terminating the communication procedure at expiry of the time supervision period. The network entity being further capable of finishing the communication procedure the reception of a response to the signaling message.

According to another exemplary aspect of the invention, a network entity for handling time supervision in a communication network comprising a plurality of entities, the network entity being capable of receiving a first signaling message related to a communication procedure, the first signaling message comprising a first timer validity information. The network entity being further capable of determining a further step of the communication procedure. The network entity being further capable of determining a current time and determining a time supervision period associated with a further signaling message related to the communication procedure or to a further communication procedure. The network entity being further capable of determining a second timer validity information based on the current time and a time supervision period for the further signaling message. The network entity being further capable of sending the further signaling message to a further entity in the communication system, the further signaling message comprising the timer validity information. The network entity being further capable of time supervising the reception of a response to the further signaling message. The network entity being further capable of terminating the communication procedure at expiry of the first timer validity information. The network entity being further capable of determining that a remaining time period before expiry of the first timer validity information reaches a threshold. The network entity being further capable of sending a response associated with the first signaling message related to the communication procedure, based on the reception of a response to the further signaling message.

According to another exemplary aspect of the invention, a system for handling time supervision in a communication network comprising a plurality of entities, the system comprising a first entity and at least one second entity.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

In the following, methods and network entities for handling timers and associated computer programs according to the invention are described in more detail.

Within the context of the present application, the term "communication network" may particularly denote a collection of nodes or entities, related transport links, and associated management needed for running a service, for example a telephony service or a packet transport service. Depending on the service, different node types or entities may be utilized to realize the service. A network operator owns the communication network, and offers the implemented services to its subscribers. Typical examples of a communication network are radio access network, mobile backhaul network, or core network.

The term "entity" may particularly refer to a node in the communication network or to a UE attached to such communication network. It may refer to any handling element in a communication procedure that can initiate such a communication procedure, receive it, or forward it. In a wider context, the term "entity" may also particularly refer to software instances, computer processes, or virtual machines communicating with each other.

The term "timer validity" may particularly refer to an information element wherein the timer validity information indicates an absolute point in time comprising year, date, time, and time zone information. An example of such timer validity may be an information element coded in a Coordinated Universal Time, UTC, format. This format, for example, comprises information such as:
Year:
YYYY (eg 1997)
Year and month:
YYYY-MM (eg 1997-07)
Complete date:
YYYY-MM-DD (eg 1997-07-16)
Complete date plus hours and minutes:
YYYY-MM-DDThh:mmTZD (eg 1997-07-16T19:20+01:00)
Complete date plus hours, minutes and seconds:
YYYY-MM-DDThh:mm:ssTZD (eg 1997-07-16T19:20:30+01:00)
Complete date plus hours, minutes, seconds and a decimal fraction of a second:
YYYY-MM-DDThh:mm:ss.sTZD (eg 1997-07-16T19:20:30.45+01:00)
where:
YYYY=four-digit year
MM=two-digit month (01=January, etc.)
DD=two-digit day of month (01 through 31)
hh=two digits of hour (00 through 23) (am/pm NOT allowed)
mm=two digits of minute (00 through 59)
ss=two digits of second (00 through 59)
s=one or more digits representing a decimal fraction of a second
TZD=time zone designator (Z or +hh:mm or −hh:mm)

Further information on coding of information elements indicating an absolute point in time can also be found in the W3C document "Date and Time Formats", or in ISO 8601, the International Standard for the representation of dates and times. UTC is defined by International Telecommunications Union Recommendation ITU-R TF.460-6.

Figures 1, 2:
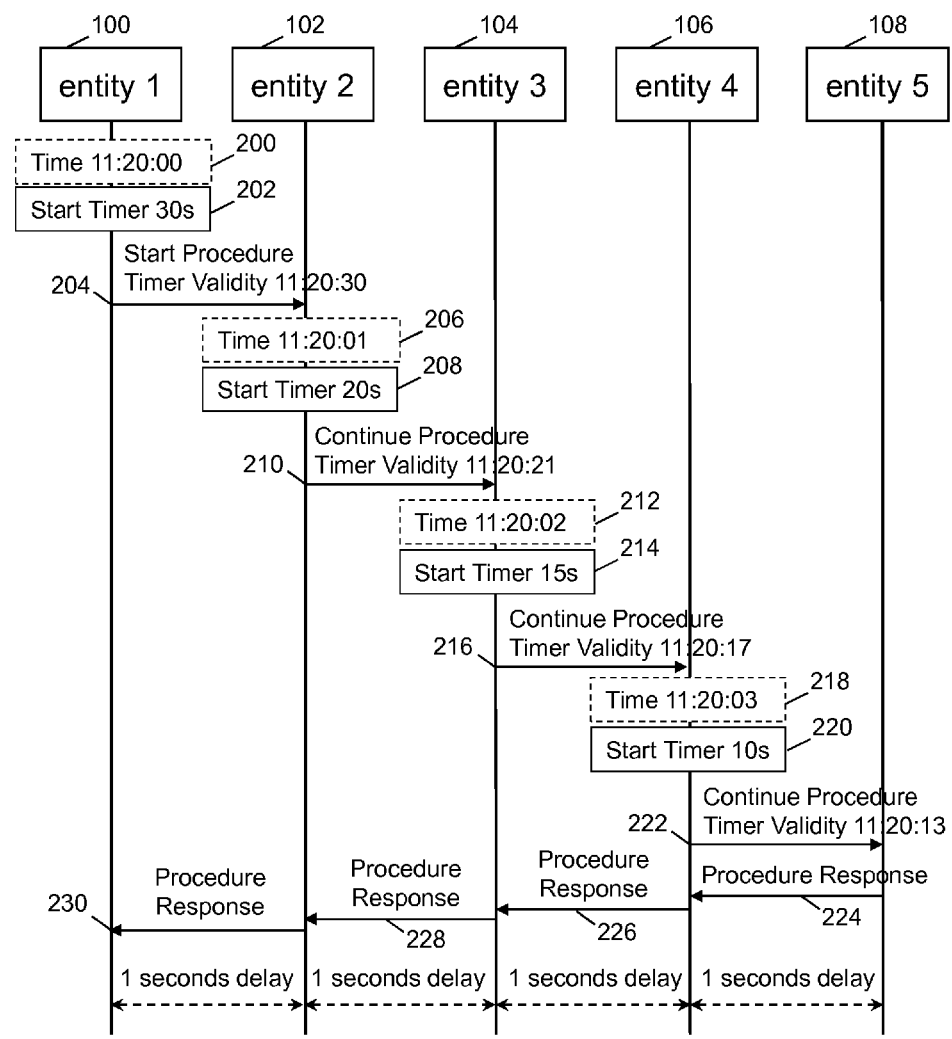
FIG. 1 is block diagram illustrating a system for handling timers according to an embodiment of the invention.
FIG. 2 is a procedure flow diagram illustrating the forwarding of timer validity information according to an embodiment of the invention.

Referring to FIG. 1, a system for handling time supervision in a communication network according to an embodiment is shown.

The communication network comprises a plurality of entities 100-108, wherein in FIG. 1 three entities 100, 102, 104 are show in order to exemplify the principle of handling a communication procedure in a communication network. The entities 100, 102, 104 are interconnected by transport links in such a way that the first entity 100 can communicate with the second entity 102. In the same manner, the second entity 102 can communicate with a third entity 104, and so on. On a logical level, the plurality of entities 100-108 of the communication network can communicate with each other, so any single entity 100-108 can communicate with any other single entity 100-108 of the plurality of entities 100-108 of the communication network.

For example, the entities 100-108 may be network nodes such as a Mobile Switching Center, MSC, or a CSCF, or a Serving Gateway Support Node, SGSN, or a Mobility Management Entity, MME, or a User Equipment, UE.

The first entity 100 determines 300 whether a supervision condition for supervising a communication procedure is fulfilled. Based on a result of the step of determining 301 the supervision condition, adding 308, by the first entity 100, a timer validity information to a signaling message related to the communication procedure, and sending the signaling message to a second entity 102 to be involved in the communication procedure. Here the second entity 102 may be pre-determined by the type of communication procedure, so the first entity 100 does not have to select the second entity 102. By alternative, the first entity 100 may select the second entity 102 and based on this selection the first entity 100 involves the second entity 102 in the communication procedure. This selection may be done based on a load sharing algorithm, may by alternative be based on operator pre-configuration by operation and maintenance means, or, may also be based on a routing decision in the first entity 100.

In this scenario the first entity 100 may add a single timer validity information to the signaling message. By alternative, the first entity 100 may add multiple instances of timer validity information to the signaling message. In this case each instance of the timer validity information may correspond to a different step of the communication procedure, or may also refer to different communication procedures.

The supervision condition may be associated with a type of the communication procedure and is involving at least one further entity 100-104 of the plurality of entities 100-104 in the communication network. In a typical entity 100-104, several communication procedures run in parallel, and an entity 100-104 may also contain internally sub-entities, which may also communicate with each other. In contrast to this entity internal communication, here it is referred to communication between entities 100-104 and therefore the communication procedure involves at least one further entity 100-104 of the plurality of entities 100-104 in the communication network.

Subsequent to the sending of the signaling message related to the communication procedure containing the timer validity information, the first entity 100 determines, whether a termination condition for termination of the communication procedure is fulfilled. In the same manner as there is a condition to start a communication procedure in the first entity 100, there is a condition when the communication procedure is finished or has to be terminated.

So based on a result of the step of determining the termination condition, the first entity 100 may terminate the running communication procedure. The termination condition may be associated with a reception of a response to the signaling message sent to the second entity 102 or with an expiry of a supervision timer supervising the reception of the response to the sent signaling message.

Also a second entity 102 performs a method for handling time supervision in a communication network comprising a plurality of entities 100-104. The second entity 102 may be the second entity 102 of FIG. 1. The method in the second entity 102 comprises the receiving, of a first signaling message associated with a communication procedure from a first entity 100, the first signaling message containing a first timer validity information.

The method in the second entity 102 comprises further the determining, whether a further processing condition for performing a further step of the communication procedure is fulfilled, the further processing condition being associated with the first timer validity information. A communication procedure, after the communication procedure start has been triggered, comprises a number of steps. These steps may comprise consecutive steps to be performed in a certain order, or as an alternative, may comprise alternative step options. So if a further processing condition has been reached a decision is taken, which of the alternative further steps of the communication procedure to take, or whether to perform the next consecutive steps of the communication procedure.

So the further step of the communication procedure may be any one of the following steps, performed by the second entity 102. The second entity 102 may send 414 a further signaling message associated with the communication procedure to a further entity 100-104 of the plurality of entities 100-104 of the communication network, the further signaling message containing a further timer validity information. In this case the communication procedure is continued to a further entity 100-104, which may be a third entity 104 of FIG. 1.

The second entity 102 may send 414 a further signaling message associated with a further communication procedure to a further entity 100-104 of the plurality of entities 100-104 of the communication network, the further signaling message containing a further timer validity information. In this case a new communication procedure is started by the second entity 102, which involves a third entity 104, which may be the third entity 104 of FIG. 1.

The second entity 102 may send 512 a response to the first signaling message to the first entity 100. In this case the task of the communication procedure may be completed and a response may be returned to the entity 100 originating the communication procedure. It may also be the case that an error has occurred during the execution of the communication procedure and the response contains an indication of the occurred error.

The second entity 102 may terminate 504 the communication procedure. In this case the communication procedure may be ended without informing the entity 100 originating the communication procedure. This may happen if for example a severe error has happened in the handling by entity 102, or if the communication procedure has been pending for too long without progress in the steps of the communication procedure.

The further processing condition in the second entity 102 is associated with any one of the following conditions. An expiry 416 of a supervision timer supervising the reception of a response to a signaling message associated with the communication procedure, before expiry of the first timer validity information. So in case the further step of the communication procedure involves the sending of a signaling message to a third entity 104, the response to this signaling message is supervised by a timer. So the expiry of this supervision timer triggers the further processing condition.

The first timer validity information may expire 502 in the second entity 102 and this triggers the further processing condition.

The second entity 102 may receive 510 a response to a signaling message associated with the communication procedure, before expiry of the first timer validity information. So in case the further step of the communication procedure involves the sending of a signaling message to a third entity 104, a corresponding response is received and this triggers the further processing condition.

The second entity 102 may determine 602 that a remaining time period before expiry of the first timer validity information reaches a threshold. So in case the further step of the communication procedure involves the sending of a signaling message to a third entity 104, the response to this signaling message is supervised by a timer. In this case the further processing condition is triggered when remaining time period before expiry of the first timer validity information reaches a threshold.

This threshold may be based on a signaling delay time for a signaling message to traverse between the first entity 100 and the second entity 102 of the communication network. The signaling delay time may relate to a propagation delay of a transport link between the entities 100-104, plus the processing time of transiting entities transiting a signaling message between the first entity 100 and the second entity 102 of the communication network. Also the processing time in the first entity 100 and the second entity 102 add to the overall signaling delay time for a signaling message. So the threshold may be chosen in such a way that the further processing condition is triggered well in time so that a response sent from the second entity 102 to the first entity 100 reaches the first entity 100 before the expiry of the timer validity in the first entity 100.

As described, second entity 102 may subsequent to the step of receiving the first signaling message, send a second signaling message associated with the communication procedure to a further entity 100-104 of the plurality of entities 100-104 of the communication network, the second signaling message containing a second timer validity information. So the second entity 102 may send a signaling message to a third entity 104, or in another step to a fourth entity 106, and so on. A fourth entity 106 is not depicted in FIG. 1, but it shall be understood that the communication procedure may involve more than three entities. So the communication procedure may be continued to a fourth entity 106, or a new communication procedure is started towards a fourth entity 106, or the third entity 104 first sends a signaling message to a fourth entity 106, and then sends another signaling message to a fifth node 108. So for a person skilled in the art it is clear that the methods performed by the second entity 102 may in a equivalent way also be applied in a third node 104, a fourth node 106, and so on. For simplicity reasons FIG. 1 is limited to three entities 100, 102, 104.

Referring to FIG. 2, a method in a system for handling time supervision in a communication network will be explained.

As described above, for a person skilled in the art it is clear that the methods performed by the second entity 102 may in a similar way also be applied in a third node 104, a fourth node 106, and so on. FIG. 2 shows an example of a communication network wherein a communication procedure involves five entities 100-108 in a consecutive order. This example may be well suited to explain the handling of the timer validity information in relation to an absolute time, a signaling delay, and a communication procedure. In this scenario the entity 1 may perform the method of the first entity 100, while entity 2 102 to entity 5 108 may perform the method of the second entity 102.

The communication procedure may be started in entity 1 100 at a time 200 of 11:20:00, referring to 11 o'clock, 20 minutes and zero seconds. The communication procedure may to be time supervised and the related supervision timer 202 is 30 s referring to 30 seconds. A corresponding signaling message 204 called "Start Procedure" may be sent from entity 1 100 to entity 2 102. Entity 1 102 may include the timer validity information into the signaling message 204. In this case the communication procedure may be valid from 11:20:00 for 30 seconds. So entity 1 100 may await a corresponding response to the signaling message 204 called "Start Procedure" within the time supervision period. The timer validity information may be set to 11:20:30 by entity 1 100 and may be added by entity 1 100 to the signaling message, which may correspond to the current time of 11:20:00 plus the 30 s time supervision period.

In the next step entity 2 102 may receive the signaling message 204 called "Start Procedure". It may contain the timer validity information set to 11:20:30. As a signaling delay of one second between entity 1 and entity 2 is assumed, the signaling message may arrive 206 at 11:20:01 time. Entity 2 102 may continue the communication procedure to the entity 3 104, by sending a signaling message 210 called "Continue Procedure". Entity 2 102 may supervise the communication procedure and the related supervision timer 208 may be 20 s. So the timer validity information added by entity 2 102 to the signaling message 210 "Continue Procedure" may be set to 11:20:21.

In the next step entity 3 104 may receive the signaling message 210 called "Continue Procedure". It may contain the timer validity information set to 11:20:21. As a signaling delay of one second between entity 2 102 and entity 3 104 is assumed, the signaling message may arrive 212 at 11:20:02 time. Entity 3 104 may continue the communication procedure to the entity 4 106, by sending a signaling message 216 called "Continue Procedure". Entity 3 104 may supervise the communication procedure and the related supervision timer 214 may be 15 s. So the timer validity information added by entity 3 104 to the signaling message 216 "Continue Procedure" may be set to 11:20:17.

In the next step entity 4 106 may receive the signaling message 216 called "Continue Procedure". It may contain the timer validity information set to 11:20:17. As a signaling delay of one second between entity 3 104 and entity 4 106 is assumed, the signaling message may arrive 218 at 11:20:03 time. Entity 4 106 may continue the communication procedure to the entity 5 108, by sending a signaling message 222 called "Continue Procedure". Entity 4 106 may supervise the communication procedure and the related supervision timer 220 may be 10 s. So the timer validity information added by entity 4 106 to the signaling message 222 "Continue Procedure" may be set to 11:20:13.

In the next step entity 5 108 may receive the signaling message 222 called "Continue Procedure". It may contain the timer validity information set to 11:20:13. As a signaling delay of one second between entity 4 and entity 5 is assumed, the signaling message may arrive at 11:20:04 time. The communication procedure may end in entity 5 108, and entity 5 108 may return a corresponding response message 224 called "Procedure Response".

The response message 224, 226, 228, 230 called "Procedure Response" may be transited via entity 4 106, entity 3 104, and entity 2 102 to entity 1 100 and the communication procedure may end successfully.

In this scenario the entity 2 102 to entity 4 106 may perform the method of the second entity 102. So if a supervision period of the outgoing signaling message expires before expiration of the received timer validity information, the outgoing timer validity information may be set equal to a current time plus a supervision period of the outgoing signaling message.

Figure 3:
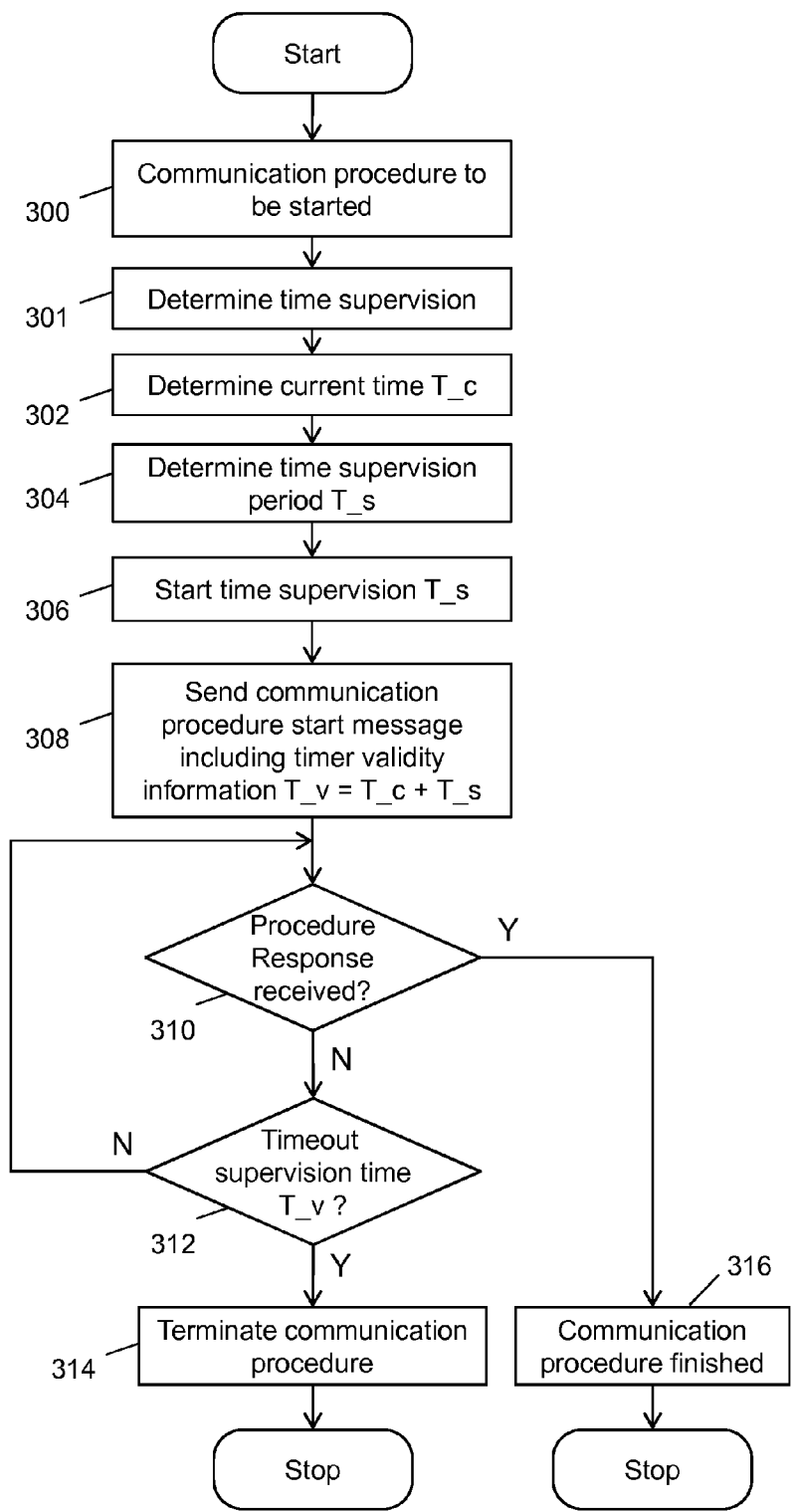
FIG. 3 is a flow diagram illustrating a method in a first entity for handling timers according to an embodiment of the invention.

Referring to FIG. 3, a method in a first entity 100 for handling time supervision in a communication network will be explained.

In step 300 a communication procedure may have to be started and it may be determined in step 301 whether a supervision condition for supervising the communication procedure is fulfilled, so whether the communication procedure shall be time supervised.

If so, in step 302 the current time may be determined. This may be done by reading a system clock integrated into the hardware platform of the first entity 100. By alternative, the current time may be fetched from a central Network Time Protocol (NTP) Server belonging to the communication network infrastructure, or belonging to the Internet. The received time information may still have to be adjusted to the local time zone of the first entity 100.

In the next step, 304, a time supervision period for a signaling message related to the communication procedure may be determined. Typically, the time supervision period may be defined by the relevant protocol or procedure specification. By alternative, the time supervision period may also be pre-defined by operation and maintenance means by the operator of the first entity 100. Steps 302 and 304 may also be performed in different order, step 304 first and then 302.

In step 306 the time supervision may be started, using the time supervision period as determined in step 304. This may typically be a timer running in the hardware platform of the entity 100 or a counter counting a periodical interrupt of the processor.

In step 308 the signaling message may be sent out, including the timer validity information, here called T_v. T_v is based on the current time, here called T_c and the supervision period, here called T_s. So T_v is calculated by the equation $T\_v = T\_c + T\_s$.

After having sent out the signaling message to the second entity 102, the supervision of the communication procedure may start. A loop may be started that first checks in step 310 whether a response to the sent signaling message has been received. If this is not the case, it may be checked in 312 whether the supervision time T_v has expired. If this is not the case, the loop may be repeated with step 310.

There may be two ways to exit the supervision of the communication procedure. The first may be the reception of a response to the sent signaling message in step 310. This leads to step 316, where the communication procedure is set to "finished" and the flow stops.

The second loop exit criteria may be the expiry of the supervision time T_v. This may lead to step 314, where the communication procedure is terminated and the flow stops.

Figure 4:
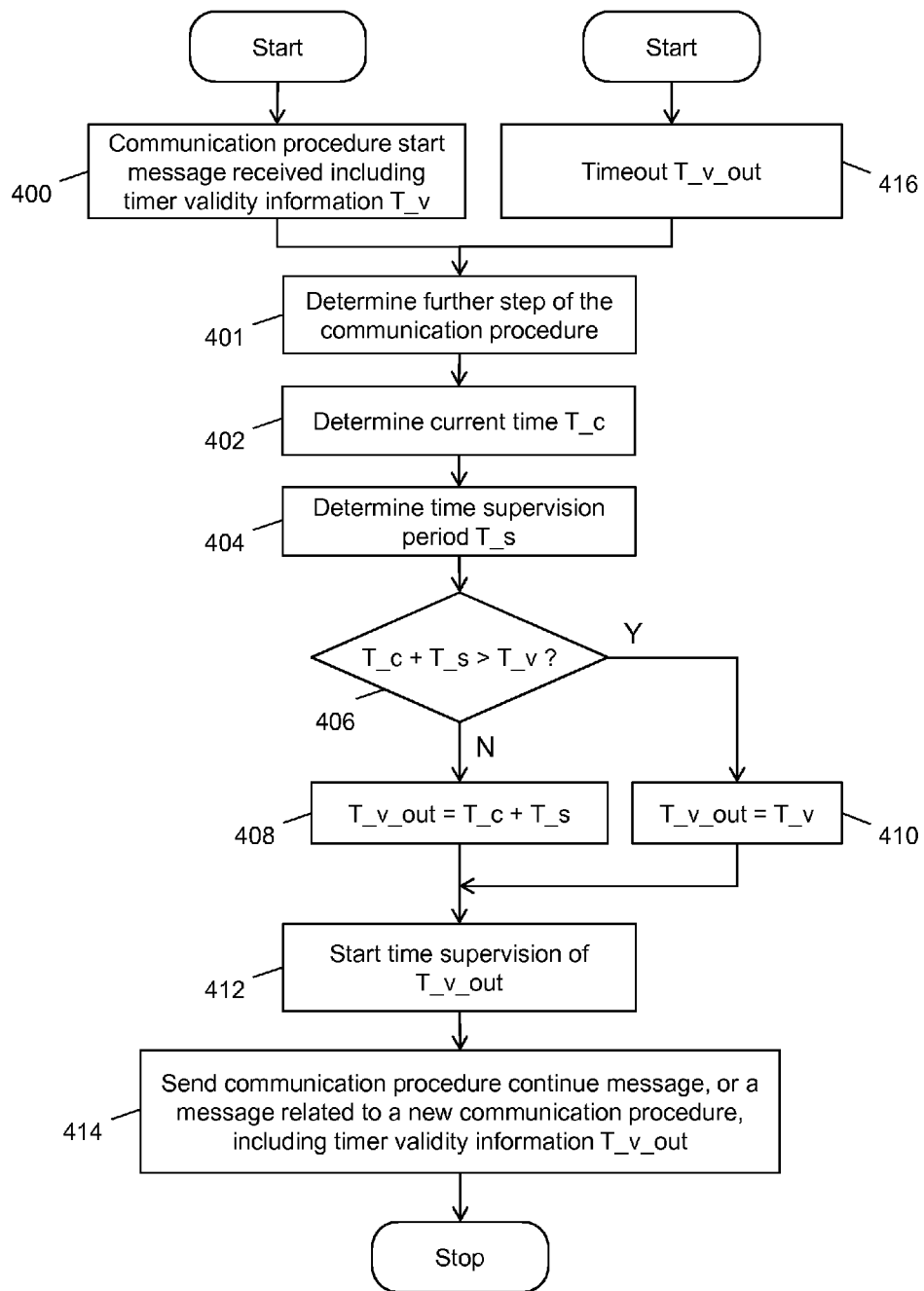
FIG. 4 is a flow diagram illustrating a first method in a second entity for handling timers according to an embodiment of the invention.

Referring to FIG. 4, a first method in a second entity 102 for handling time supervision in a communication network will be explained.

In step 400 a signaling message related to a communication procedure may be received in a second entity 102. The signaling message may contain a timer validity information T_v, which corresponds to a first timer validity information.

In step 401 the next step of the communication procedure may be determined. In this example it is assumed that the second entity 102 will continue the communication procedure to a further entity by sending a signaling message to the further entity, and the outgoing signaling message shall contain a corresponding timer validity information T_v_out, which corresponds to a second timer validity information.

So, in step 402 the current time may be determined. This may be done by reading a system clock integrated into the hardware platform of the second entity 102. By alternative, the current time may be fetched from a central Network Time Protocol (NTP) Server belonging to the communication network infrastructure, or belonging to the Internet. The received time information may still have to be adjusted to the local time zone of the second entity 102.

In the next step, 404, a time supervision period for a signaling message related to the communication procedure may be determined. Typically, the time supervision period may be defined by the relevant protocol or procedure specification. By alternative, the time supervision period may also be pre-defined by operation and maintenance means by the operator of the second entity 102. Steps 402 and 404 may also be performed in different order, step 404 first and then 402.

In the step 406 the timer validity information T_v_out for the outgoing signaling message may be determined, based on the current time T_c and the supervision period T_s. For this it may be checked in step 406, whether the sum of T_c and T_s is larger than the received T_v. If a supervision period of the further signaling message expires before expiration of the first timer validity information, the second timer validity information is set equal to a current time plus a supervision period of the further signaling message, else, the second timer validity information is set equal to the first timer validity information. So T_v_out is either T_c+T_s, or else T_v_out is set to T_v.

In step 412 the time supervision of T_v_out may be started. This may be typically a timer running in the hardware platform of the entity or a counter counting a periodical interrupt of the processor.

In step 414 the signaling message may be sent out to the further entity, including the determined timer validity information T_v_out and flow stops. This signaling message may be a continuation of the communication procedure related to the signaling message received in step 400, or by alternative, the signaling message may be related to a new communication procedure started by this signaling message.

After having sent out the signaling message to the further entity, several further steps of the communication procedure may have to be taken. One possible step may be triggered by the expiry of the T_v_out supervision timer in step 416.

In this example it is assumed that the second entity 102 will continue the communication procedure to a further entity by sending a signaling message to the further entity, and the outgoing signaling message shall contain a corresponding timer validity information T_v_out, which corresponds to a second timer validity information. So the steps 401 to 414 may be executed again and a new outgoing timer validity information T_v_out may be determined as described above.

Figure 5A:
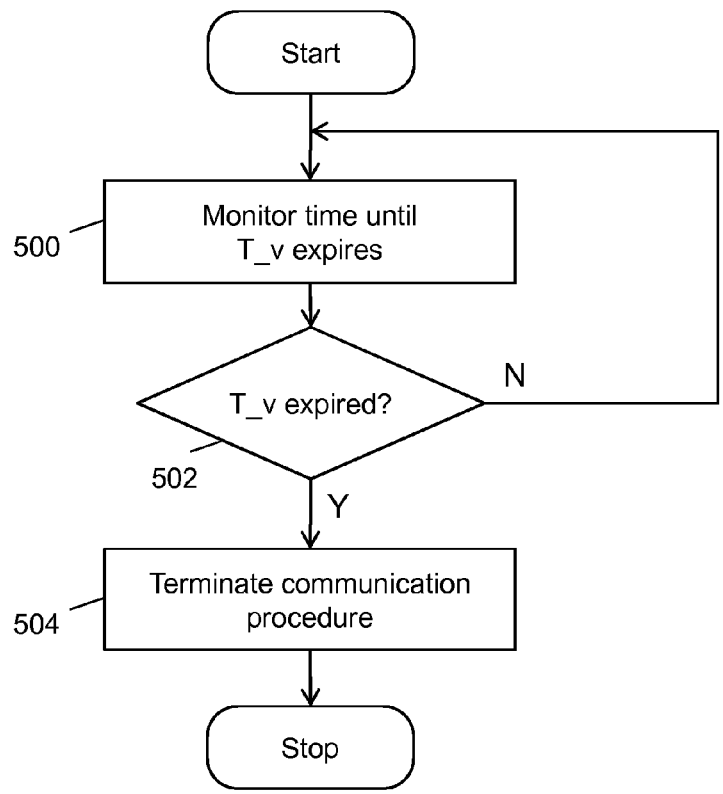
FIG. 5a is a flow diagram illustrating a second method in a second entity for handling timers according to an embodiment of the invention.

Referring to FIG. 5a, a second method in a second entity 102 for handling time supervision in a communication network will be explained.

In step 500 the second entity 102 may monitor the supervision timer T_v received from the first entity 100.

In step 502 it may be determined whether the supervision timer T_v has expired. If not, a loop may be done and the monitoring continues with step 500.

If the supervision timer T_v is expired, in step 504 the communication procedure may be terminated and the flow stops. No response is returned to the first entity 100.

Figure 5B:
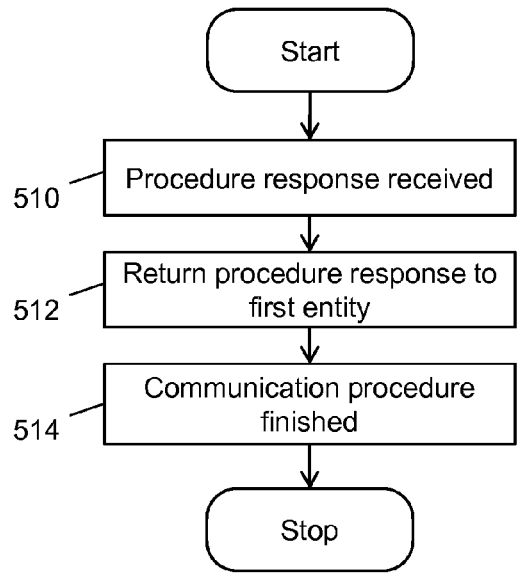
FIG. 5b is a flow diagram illustrating a third method in a second entity for handling timers according to an embodiment of the invention.

Referring to FIG. 5b, a third method in a second entity 102 for handling time supervision in a communication network will be explained.

In step 510 the second entity 102 may receive a final response for the ongoing communication procedure.

In step 512 the final response for the ongoing communication procedure may be returned to the first entity 100.

Finally the communication procedure may be finished in step 514 and the flow may stop.

Figure 6:
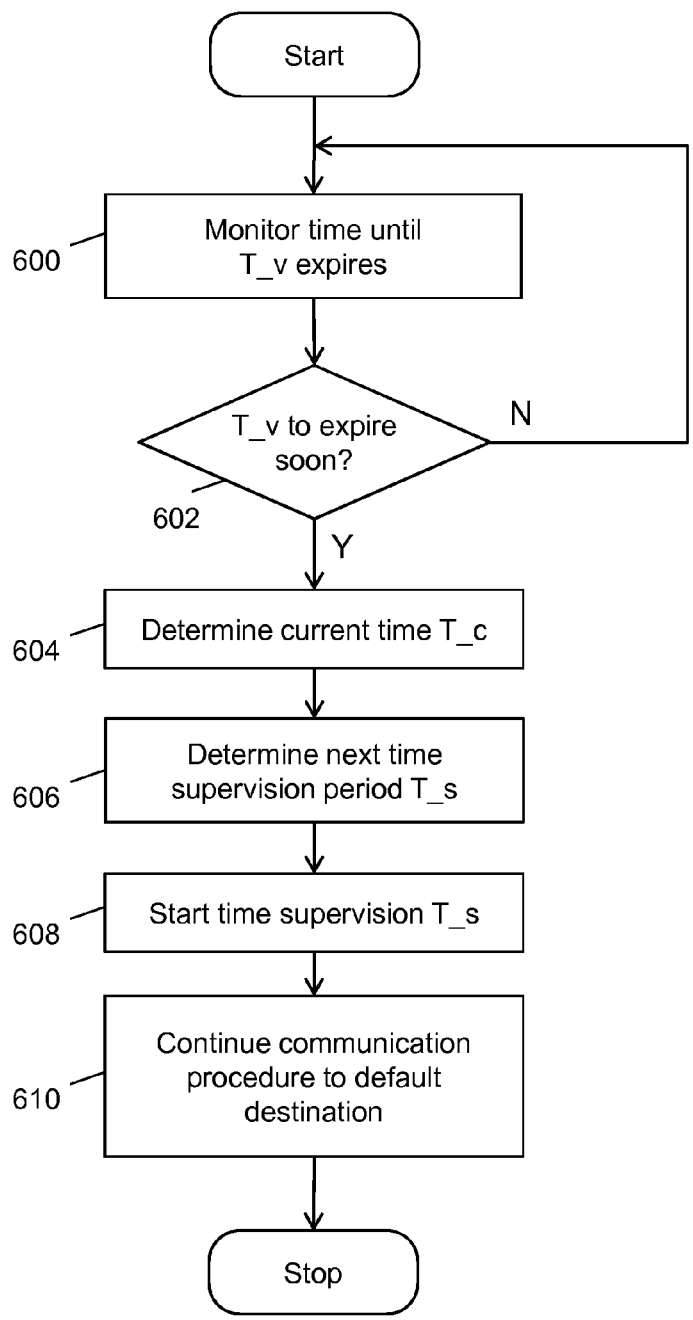
FIG. 6 is a flow diagram illustrating a fourth method in a second entity for handling timers according to an embodiment of the invention.

Referring to FIG. 6, a fourth method in a second entity 102 for handling time supervision in a communication network will be explained.

In step 600 the second entity 102 may monitor the supervision timer T_v received from the first entity 100.

In step 602 it may be determined whether the supervision timer T_v will expire soon. If not, a loop is done and the monitoring continues with step 600.

If the supervision timer T_v will expire soon, so a remaining time period before expiry of the timer T_v reaches a threshold, step 604 may be performed. In this example it is assumed that a signaling message may be sent to a default destination if the supervision timer T_v will expire soon. However, also other default steps of the communication procedure could be applied.

So, in step 604 the current time T_c may be determined. This may be done by reading a system clock integrated into the hardware platform of the second entity 102. By alternative, the current time can be fetched from a central Network Time Protocol (NTP) Server belonging to the communication network infrastructure, or belonging to the Internet. The received time information may still have to be adjusted to the local time zone of the second entity 102.

In the next step, 606, a time supervision period for a signaling message related to the communication procedure may be determined. Typically, the time supervision period is defined by the relevant protocol or procedure specification. By alternative, the time supervision period may also be pre-defined by operation and maintenance means by the operator of the second entity 102. Steps 604 and 606 may also be performed in different order, step 606 first and then 604.

In step 608 the time supervision may be started. This may typically be a timer running in the hardware platform of the entity or a counter counting a periodical interrupt of the processor.

In step 610 the signaling message may be sent out, continuing the communication procedure to a default destination and the flow stops.

The signaling message to the default destination may also include the timer validity information. In this case a T_v_out timer validity information is determined in the same way as described above. A signaling message to a default destination may also omit timer validity information if the default destination cannot handle this information.

Figure 7:
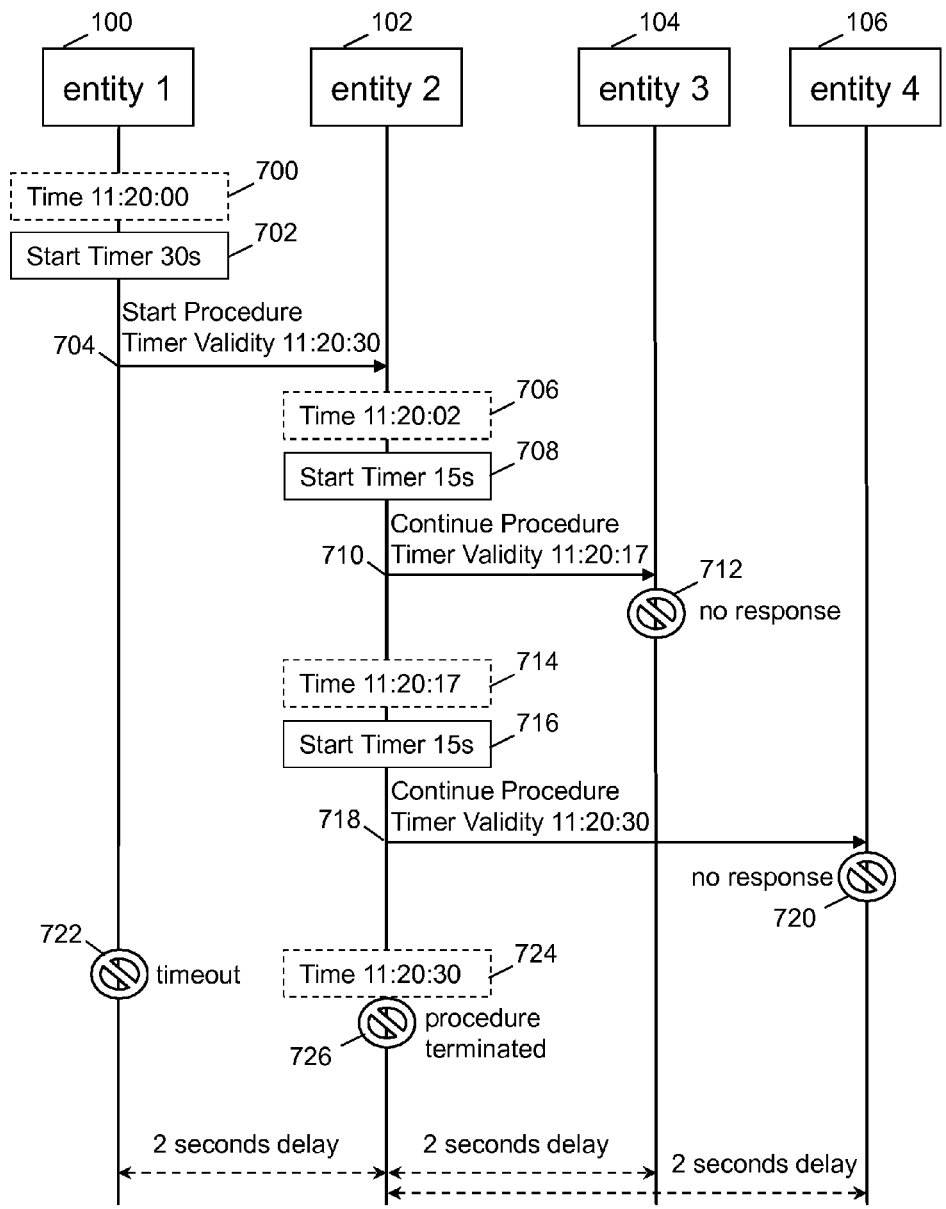
FIG. 7 is a procedure flow diagram illustrating the handling at expiry of timer validity according to an embodiment of the invention.

Referring to FIG. 7, a method in a system for handling time supervision in a communication network will be explained.

This scenario shows a case where an entity sequentially forwards signaling messages to different destinations, trying to find a destination that responds to the signaling message in time. This may be an example for delivering a telephone call to a subscriber with multiple devices. The telephone call is delivered to the first device, and if the subscriber does not answer on this device, the telephone call is delivered to the next device, and so on until the subscriber answers on a device, or a time supervision for delivery of the telephone call expires.

FIG. 7 shows an example of a communication network wherein a communication procedure involves four entities 100-106. In this scenario the entity 1 100 performs the method of a first entity 100, while entity 2 102 and entity 3 104 perform the method of a second entity 102.

The communication procedure is started in entity 1 100 at a time 700 of 11:20:00, referring to 11 o'clock, 20 minutes and zero seconds. The communication procedure is to be time supervised and the related supervision timer 702 is 30 s referring to 30 seconds. A corresponding signaling message 704 called "Start Procedure" may be sent from entity 1 100 to entity 2 102. Entity 1 100 may include the timer validity information into the signaling message 704. In this case the communication procedure may be valid from 11:20:00 for 30 seconds. So entity 1 100 may await a corresponding response to the signaling message 704 called "Start Procedure" within the time supervision period. The timer validity information set by entity 1 100 and added into the signaling message 704 is set to 11:20:30, which corresponds to the current time 700 of 11:20:00 plus the 30 s time supervision period. In this example entity 1 100 may refer to a UE and the timer validity information corresponds to the time the subscriber indents to wait for a response to his telephone call request, so a reply from a B-party.

In the next step entity 2 102 may receive the signaling message 704 called "Start Procedure". It may contain the timer validity information set to 11:20:30. As a signaling delay of two second between entity 1 100 and entity 2 102 is assumed, the signaling message arrives 706 at 11:20:02 time. Entity 2 102 may continue the communication procedure to the entity 3 104, by sending a signaling message 710 called "Continue Procedure". Entity 2 102 may supervise the communication procedure and the related supervision timer 708 is 15 s. So the timer validity information added by entity 2 102 to the signaling message 710 "Continue Procedure" may be set to 11:20:17. In this example entity 2 102 may refer to a serving control entity of the called subscriber, which may be an S-CSCF in an IP Multimedia System (IMS) context. The serving control entity of the called subscriber may try to deliver the terminating call to the first device of the subscriber, in this example entity 3 104, which may correspond to a fixed telephone. However, here it is assumed that there is no response 712 from that fixed telephone, so no response is received in entity 2 102 in during the supervision time 708 of 15 seconds.

This may cause the time supervision 708 of the signaling message 710 "Continue Procedure" to expire at a time 714 as indicated by the timer validity information, so at 11:20:17. This may correspond to step 416 in FIG. 4. Entity 2 102 may then determine the next step of the communication procedure. In this example where entity 2 102 corresponds to a serving control entity of the called subscriber, the next step of the communication procedure may be to try to deliver the terminating call to the second device of the subscriber, in this example entity 4 106, which may correspond to a mobile telephone. So entity 2 102 may continue the communication procedure to the entity 4 106, by sending a signaling message 718 called "Continue Procedure". Entity 2 102 may supervise the communication procedure and the related supervision timer 716 may be 15 s. However, since the current time 714 is already 11:20:17, the supervision time 11:20:17+15 s=11:20:32, which would be past the expiry of the received timer validity information of 11:20:30. So in this case the entity 2 102 may set the outgoing timer validity information to the received timer validity information of 11:20:30. So the timer validity information added by entity 2 102 to the signaling message 718 "Continue Procedure" may be set to 11:20:30.

Here we assume that also on the mobile telephone there is no reply 720. At 724 11:20:30 the time supervision of the received timer validity information may expire. This may correspond to steps 500 to 504 of FIG. 5a. The communication procedure may be terminated 724 in entity 2 102 and no response is returned to entity 1 100. In parallel to this the timeout 722 of the supervision timer may happen also in entity 1 100 and the communication procedure may be terminated also in entity 1 100. So a UE corresponding to entity 1 100 may inform the subscriber that the destination does not respond.

There may be further devices in use by the called B-subscriber, and just two devices may have been tried, entity 3 104 and entity 4 106. But as there may be no time left, no further devices have been contacted. Due to the timer validity information, entity 2 102 may exactly determine when to stop trying to deliver the terminating call. There are no overdue responses, which cause inconsistencies in the network, when entity 1 100 still receives responses for a communication procedure that has terminated already.

Figure 8:
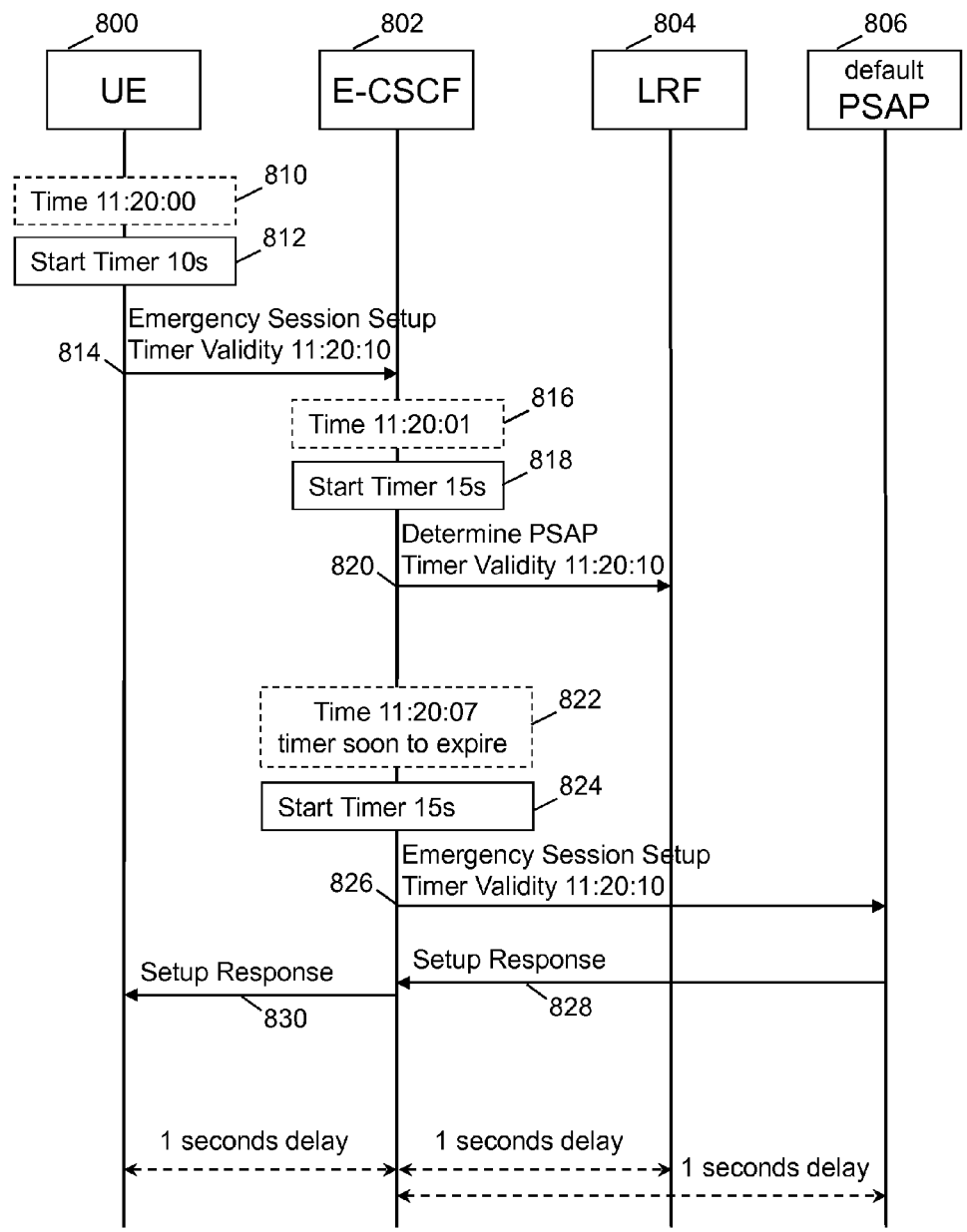
FIG. 8 is a procedure flow diagram illustrating the handling when timer validity expires soon according to an embodiment of the invention.

Referring to FIG. 8, a method in a system for handling time supervision in a communication network will be explained.

This scenario shows a case where a UE 800 may set up an emergency session, the UE 800 corresponding to a first entity 100. The emergency session may be handled by an E-CSCF 802 corresponding to a second entity 102. In order to determine the nearest Public Safety Answering Point 806, PSAP, the E-CSCF may involve a Location Register Function 804, LRF, which may be a database for looking up the closest PSAP for a given geographical position of a UE 800. The LRF 804 may correspond to a third entity 104. Finally the emergency call may be forwarded to the closest PSAP for handling of the emergency case; the closest PSAP may correspond to a fourth entity 106.

The emergency session setup procedure may be started at the UE 800 at a time 810 of 11:20:00, referring to 11 o'clock, 20 minutes and zero seconds. The communication procedure may to be time supervised and the related supervision timer 812 may be 10 s referring to 10 seconds. A corresponding signaling message 814 called "Emergency Session Setup" may be sent from the UE 800 to the E-CSCF 802. The UE 800 may include the timer validity information into the signaling message 814. In this case the communication procedure may be valid from 11:20:00 for 10 seconds. So the UE 800 may await a corresponding response to the signaling message 814 called "Emergency Session Setup" within the time supervision period 812. The timer validity information set by the UE 800 and added into the signaling message may be set to 11:20:10, which corresponds to the current time of 11:20:00 plus the 10 s time supervision period.

In the next step the E-CSCF 802 may receive the signaling message 814 called "Emergency Session Setup". It may contain the timer validity information set to 11:20:10. As a signaling delay of one second between UE 800 and E-CSCF 802 is assumed, the signaling message may arrive 816 at 11:20:01 time. The E-CSCF 802 may have now to determine the responsible PSAP closest to the geographical position of the UE 800. For this the E-CSCF 802 may continue the communication procedure to the LRF 804, by sending a signaling message 820 called "Determine PSAP". The E-CSCF 802 may supervise the communication procedure and the related supervision timer 818 may be 15 s. Also here the supervision time would be too long, so the E-CSCF 802 may forward the received timer validity information set to 11:20:10 to the LRF 804.

It is assumed here that there may be some bigger emergency case and the LRF 804 may be overloaded, so cannot deliver the responsible PSAP result response. The E-CSCF 802 may monitor the supervision time 818 and may determine 822 at 11:20:07 that the timer is to expire soon. Based on the knowledge that the signaling delay between the nodes 800-806 may be one second, reaching a PSAP 806, returning a response to the E-CSCF 804 and returning the response to the UE 800 would take 3 seconds, the threshold may be set to 3 seconds before expiry of the time supervision 818. This may correspond to steps 600 and 602 of FIG. 6.

Since no closest PSAP could be determined in time, the emergency session setup request 826 may be forwarded to the default PSAP 806. This default PSAP 806 may be defined in the E-CSCF 802 by operation and maintenance means by the operator of the E-CSCF 802. Also this signaling message 826 called "Emergency Session Setup" may be time supervised 824 and the related supervision timer may be 15 s. Also here the supervision time would be too long, so the E-CSCF 802 may forward the received timer validity information set to 11:20:10 to the default PSAP 806.

The default PSAP 806, for example by checking the received timer validity information, may prioritize this emergency request 826 and replies 828 promptly. The corresponding response signaling message 828 is transferred 830 via the E-CSCF 802 to the UE 800 and may arrive still in time at the UE 800.

Figure 9:
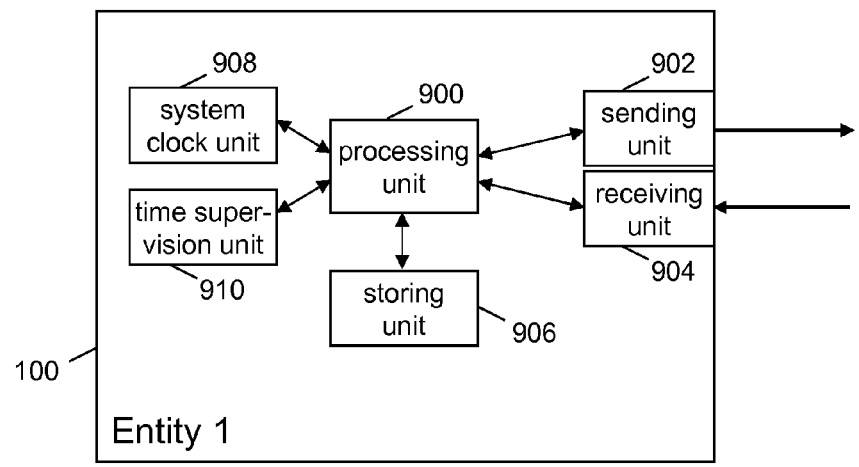
FIG. 9 is a block diagram illustrating a first entity for handling timers according to an embodiment the invention.

Referring to FIG. 9, an entity in a system for handling time supervision in a communication network will be described. The illustrated entity may correspond to the entity 1 100 illustrated in FIG. 1. The entity 1 100 may be adapted to perform one or more steps of the above described method shown in FIG. 3.

The entity 1 100 may comprise a number of functional units, which are described in further detail below and which are adapted to perform respective method steps.

For example, the entity 100 may be a network node such as a MSC, or a CSCF, or a SGSN, or a MME, or by alternative a UE.

A processing unit 900 of the entity 1 100 may be adapted to determine whether a communication procedure is to be started which requires time supervision. The processing unit 900 may further be adapted to determine the current time with the help of the system clock unit 908 and calculate a timer validity information based on the current time and a time supervision period associated with the communication procedure. The processing unit 900 may further be adapted to compose a signaling message related to the communication procedure, the signaling message comprising the timer validity information, and send the signaling message via the sending unit 902 to an entity 2 102. The processing unit 900 may further be adapted to time supervise the reception of a response to the signaling message with the help of the time supervision unit 910. The processing unit 900 may further be adapted to receive and analyze a response from an entity 2 102 with the help of the receiving unit 904. The processing unit 900 may further be adapted to terminate the communication procedure at expiry of the time supervision period or the reception of a response to the signaling message. In a practical implementation the processing unit 900 may be one processor taking care of all the above functions, or may also be distributed over more than one processor, wherein the functions are distributed over the available processors.

The entity 1 100 may further comprise a sending unit 902 and a receiving unit 904 via which the entity 1 100 can communicate with an entity 2 102, or with other entities of the communication network. The sending unit 902 may send out signaling messages composed by the processing unit 900. The receiving unit 904 may receive signaling messages originating from other entities of the communication network, and forward the received signaling messages to the processing unit 900 for handling.

The entity 1 100 may also comprise a storing unit 906 for storing information related to the handling of timer supervision. The storing unit 906 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 906 may be used by the procession unit 900 to store information, for example a timer validity information, a communication procedure state, or program code.

The entity 1 100 may also comprise a system clock unit 908 for provision of the current time. The current time may be fetched by this system clock unit 908 from a NTP server located in the communication network or the Internet. For interfacing the NTP server, the sending unit 902 and receiving unit 904 interfaces may be used, or a separate interface may be utilized. By alternative, the system clock unit 908 may host an atomic clock, or a Global Positioning System (GPS) based time receiver, or radio-controlled clock that is synchronized by a time code bit stream transmitted by a radio transmitter connected to a time standard such as an atomic clock to obtain the current time. The current time may be requested by instructions from the procession unit 900.

The entity 1 100 may also comprise a time supervision unit 910 for supervising timers running in the entity 1 100. A timer may for example be implemented by a periodic interrupt signal from the system clock unit 908 and a counter, or by the processor clock of the procession unit 900 and a shift register. The time supervision unit 910 performs the time supervision of signaling messages sent to the entity 2 102. A timer in the time supervision unit 910 may be instantiated, started, stopped, reset, and removed by instructions from the procession unit 900.

Figure 10:
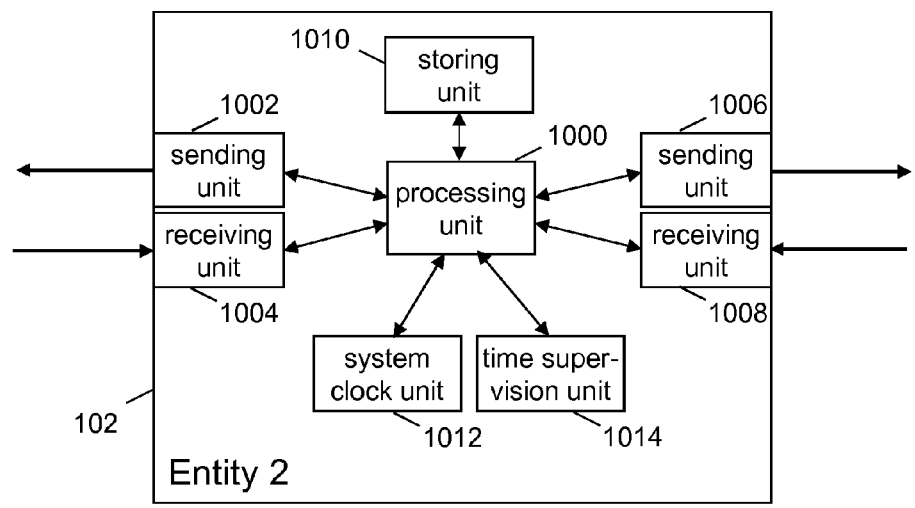
FIG. 10 is a block diagram illustrating a second entity for handling timers according to an embodiment the invention.

Referring to FIG. 10, an entity in a system for handling time supervision in a communication network will be described. The illustrated entity may correspond to the entity 2 102 or entity 3 103 illustrated in FIG. 1, or entities 102-108 of FIG. 2. The entities may be adapted to perform one or more steps of the above described method shown in FIG. 4, 5*a*, 5*b*, or 6.

The entities 102-108 may comprise a number of functional units, which are described in further detail below and which are adapted to perform respective method steps.

For example, the entities 102-108 may be network nodes such as a MSC, or a CSCF, or a SGSN, or a MME, or by alternative a UE.

A processing unit 1000 of the entities 102-108 may be adapted to receive a signaling message via receiving unit 1004, 1008 interfaces related to a communication procedure, the signaling message comprising a first timer validity information. The processing unit 1000 may further be adapted to determine whether the communication procedure is to be continued, requiring sending of a further signaling message to a further entity of the communication network, the further signaling message requiring time supervision. The processing unit 1000 may further be adapted to determine the current time with the help of the system clock unit 1012 and calculate a second timer validity information based on the current time and a time supervision period for the further signaling message. The processing unit 1000 may further be adapted to compose a further signaling message related to the communication procedure and send it to a further entity in the communication system via a sending unit 1002, 1006 interface, the further signaling message comprising the timer validity information. The processing unit 1000 may further be adapted to time supervise with the help of the time supervision unit 1014 the reception of a response to the signaling message. The processing unit 1000 may further be adapted to determine the termination of the communication procedure if a supervision period of the further signaling message expires after expiration of the first timer validity information. The processing unit 1000 may further be adapted to determine that a remaining time period before expiry of the first timer validity information reaches a threshold. The processing unit 1000 may further be adapted to compose and send a response associated with the signaling message related to the communication procedure via a sending unit 1002, 1006 interface. In a practical implementation the processing unit 1000 may be one processor taking care of all the above functions, or may also be distributed over more than one processor, wherein the functions are distributed over the available processors.

The entities 102-108 may further comprise a sending unit 1002 and a receiving unit 1004 via which the entities 102-108 can communicate with other entities 100-108, or with other entities of the communication network. The sending unit 1002 may send out signaling messages composed by the processing unit 1000. The receiving unit 1004 may receive signaling messages originating from other entities of the communication network, and forward the received signaling messages to the processing unit 1000 for handling. The entities 102-108 may further comprise a second sending unit 1006 and a second receiving unit 1008 via which the entities 102-108 can communicate with other entities 100-108, or with other entities of the communication network. The second send/receive interface complements the first send/receive interface and may perform the same functions. By alternative, the entities 102-108 may comprise only a single send/receive interface.

The entities 102-108 may also comprise a storing unit 1010 for storing information related to the handling of timer supervision. The storing unit 1010 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1010 may be used by the procession unit 1000 to store information, for example a timer validity information, a communication procedure state, or program code.

The entities 102-108 may also comprise a system clock unit 1012 for provision of the current time. The current time may be fetched by this system clock unit 1012 from a NTP server located in the communication network or the Internet. For interfacing the NTP server, the sending units 1002, 1006 and receiving units 1004, 1008 interfaces may be used, or a separate interface may be utilized. By alternative, the system clock unit 1012 may host an atomic clock, or a Global Positioning System (GPS) based time receiver, or radio-controlled clock that is synchronized by a time code bit stream transmitted by a radio transmitter connected to a time standard such as an atomic clock to obtain the current time. The current time may be requested by instructions from the procession unit 1000.

The entities 102-108 may also comprise a time supervision unit 1014 for supervising timers running in the entities 102-108. A timer may for example be implemented by a periodic interrupt signal from the system clock unit 1012 and a counter, or by the processor clock of the procession unit 1000 and a shift register. The time supervision unit 1014 performs the time supervision of signaling messages sent to the entities 102-108. A timer in the time supervision unit 1014 may be instantiated, started, stopped, reset, and removed by instructions from the procession unit 1000.

According to another embodiment, a computer program is provided. The computer program may be executed by the processing units 900 and/or 1000 of the above mentioned entities 100-108 such that a method for handling time supervision as described above with reference to FIGS. 2 to 8 may be carried out or be controlled. In particular, the entities 100-108 may be caused to operate in accordance with the above described method by executing the computer program.

The computer program may be embodied as computer code, for example of a computer program product. The computer program product may be stored on a computer readable medium, for example a disk or the storing unit 906 and/or 1010 of the entities 100-108, or may be configured as downloadable information.

One or more embodiments as described above may enable at least one of the following technical effects:

Entities may set specific timer values and may have a possibility to communicate the specific timer values to the next entity of the communication procedure and by that increase the level of understanding for the receiving entity how to handle time supervision.

In communication networks deploying the claimed entities and methods there may be no/less need for manual coordination of timers across the entities of the communication network.

A communication procedure may not time out backwards in the chain due to some timers in entities expire and signaling messages are still forwarded to the final destination.

Entities may be able to take intelligent decisions if to terminate a communication procedure if timers will soon expire and by that limit unnecessary signaling and usage of network resources and resources in the entities.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for handling time supervision in a communication network comprising a plurality of entities, the method comprising:
  receiving, by a second entity, a first signaling message associated with a communication procedure from a first entity, the first signaling message containing a first timer validity information;

determining, by the second entity, whether a further processing condition for performing a further step of the communication procedure is fulfilled, the further processing condition being associated with the first timer validity information, wherein the further processing condition is associated with any one of the following conditions:
- expiry, before expiry of the first timer validity information, of a supervision timer supervising the reception of a response to a signaling message associated with the communication procedure;
- expiry of the first timer validity information;
- reception, before expiry of the first timer validity information, of a response to a signaling message associated with the communication procedure; and
- determining that a remaining time period before expiry of the first timer validity information reaches a threshold.

2. The method of claim 1, wherein the further step of the communication procedure is any of the following:
- sending, by the second entity, a further signaling message associated with the communication procedure to a further entity of the plurality of entities of the communication network, the further signaling message containing a further timer validity information;
- sending, by the second entity, a further signaling message associated with a further communication procedure to a further entity of the plurality of entities of the communication network, the further signaling message containing a further timer validity information;
- sending, by the second entity, a response to the first signaling message to the first entity; and
- terminating, by the second entity, the communication procedure.

3. The method of claim 2, wherein, if a supervision period of the further signaling message expires before expiration of the first timer validity information, the second timer validity information is set equal to a current time plus a supervision period of the further signaling message, or else the second timer validity information is set equal to the first timer validity information.

4. The method of claim 3, further comprising determining, by the second entity, that a remaining time period before expiry of the first timer validity information reaches a threshold, wherein the threshold for remaining time period before expiry of the first timer validity information in the second entity is based on a signaling delay time for a signaling message to traverse between the first entity and the second entity of the communication network.

5. The method of claim 1, wherein the timer validity information indicates an absolute point in time comprising year, date, time, and time zone information.

6. The method according to claim 1, comprising:
- determining, by the first entity, whether a supervision condition for supervising the communication procedure is fulfilled; and
- based on a result of the step of determining whether the supervision condition is fulfilled, adding, by the first entity, the timer validity information to the first signaling message, and sending the first signaling message to the second entity.

7. The method according to claim 6, wherein the supervision condition is associated with a type of the communication procedure.

8. A network entity for handling time supervision in a communication network comprising a plurality of entities, the network entity comprising:
one or more processing circuits configured to cause the network entity to:
- receive a first signaling message related to a communication procedure, the first signaling message comprising a first timer validity information;
- determine a further step of the communication procedure;
- determine a current time;
- determine a time supervision period associated with a further signaling message related to the communication procedure or to a further communication procedure;
- determining a second timer validity information based on the current time and the time supervision period for the further signaling message;
- send the further signaling message to a further entity in the communication system, the further signaling message comprising said second timer validity information;
- time supervise a reception of a response to the further signaling message;
- terminate the communication procedure at expiry of the first timer validity information;
- determining that a remaining time period before expiry of the first timer validity information reaches a threshold, and
- sending a response associated with the first signaling message related to the communication procedure, based on the reception of a response to the further signaling message.

9. The network entity of claim 8, wherein the one or more processing circuits are configured to cause the network entity to:
- determine whether a supervision condition for supervising the communication procedure is fulfilled; and
- based on a result of the determining whether the supervision condition is fulfilled:
  - add the timer validity information to the first signaling message, and
  - send the first signaling message to the second entity.

10. A system for handling time supervision in a communication network comprising a plurality of entities, the system comprising at least one network entity, and a further network entity for handling time supervision in a communication network comprising a plurality of entities, the network entity being capable of:
- determining whether a communication procedure is to be started which requires time supervision;
- determine a current time;
- determine a time supervision period associated with the communication procedure;
- send a signaling message related to the communication procedure, the signaling message comprising the timer validity information based on the current time and the time supervision period;
- time supervise the reception of a response to the signaling message;
- terminate the communication procedure at expiry of the time supervision period; and
- finish the communication procedure in response to the reception of a response to the signaling message.

11. A computer program product which, when being executed by one or more processing circuits of a second entity, causes the second entity to:

receive a first signaling message associated with a communication procedure from a first entity, the first signaling message containing a first timer validity information; and determine whether a further processing condition for performing a further step of the communication procedure is fulfilled, the further processing condition being associated with the first timer validity information, wherein the further processing condition is associated with any one of the following conditions:

expiry of a supervision timer supervising the reception of a response to a signaling message associated with the communication procedure, before expiry of the first timer validity information, expiry of the first timer validity information, reception of a response to a signaling message associated with the communication procedure, before expiry of the first timer validity information, or determining that a remaining time period before expiry of the first timer validity information reaches a threshold.

* * * * *